Figure 1:
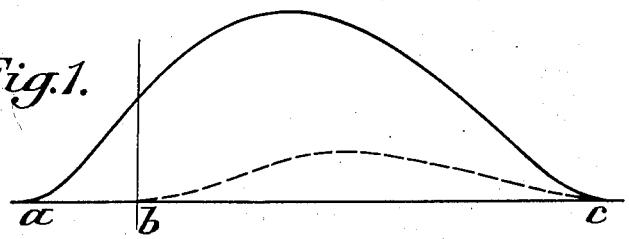

July 18, 1933.  H. DINNER  1,918,324
FUEL INJECTION DEVICE FOR INTERNAL COMBUSTION ENGINES
Filed March 8, 1932

INVENTOR:
Heinrich Dinner
BY
Pennie, Davis, Marvin & Edmonds
ATTORNEY.

Patented July 18, 1933

1,918,324

UNITED STATES PATENT OFFICE

HEINRICH DINNER, OF ENNENDA, SWITZERLAND, ASSIGNOR TO THE FIRM SULZER FRÈRES SOCIÉTÉ ANONYME, OF WINTERTHUR, SWITZERLAND

FUEL INJECTION DEVICE FOR INTERNAL COMBUSTION ENGINES

Application filed March 8, 1932, Serial No. 597,436, and in Switzerland March 25, 1931.

This invention relates to upwardly directed fuel injection devices for internal combustion engines; engines of that kind in which the fuel is injected into the cylinder together with air.

In injection devices of this type the fuel to be injected is stored prior to each injection in a preliminary storage chamber usually disposed some distance below the needle valve seating so that, before injection air is contained between the storage chamber and the seating whereby when the needle valve begins to open this air alone passes into the cylinder before actual injection of the fuel commences. Ignition is in this way undesirably retarded not only on account of the delay which takes place before actual injection but also on account of the fact that the air, injected before the fuel, tends to reduce the temperature of that air which has been compressed in the engine cylinder. With a view to overcoming this difficulty it has been proposed to introduce fuel through the seating surface of the needle valve without air and immediately the valve begins to open and then to inject the remainder of the fuel mixed with air. This however tends to result in the fuel which is first injected being insufficiently atomized so that ignition is delayed, whilst in addition the fuel is liable to burn explosively and thus cause shocks which may prove injurious to the engine. The present invention has for its object to overcome the above difficulties.

According to the present invention the fuel is introduced above the level of a preliminary storage chamber so as to pass under the action of gravity over surfaces by which part of the fuel is retained, whereby when the needle valve begins to open the air contained between the preliminary storage chamber and the needle valve seating together with the fuel retained by the said surfaces are injected in the form of a mixture into the engine cylinder. Preferably the fuel is introduced from a supply chamber or conduit at a level above that of the storage chamber which lies below the needle valve seating, an intermediate structure arranged between the seating and storage chamber being such that a portion of the fuel is retained by parts of this structure as the fuel passes under the action of gravity towards the storage chamber. The fuel may be introduced from the supply chamber or conduit through passages directed towards the valve seating so as to flow over the intermediate structure which is conveniently recessed or provided with grooves to cause part of the fuel to be retained thereby.

In the accompanying drawing

Figure 2:
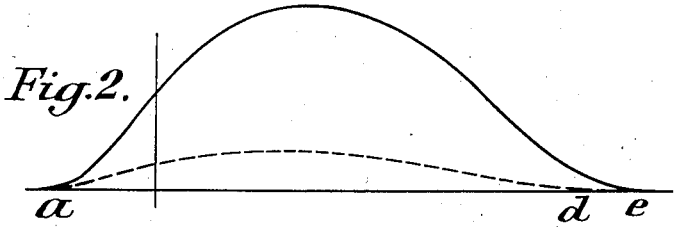
Figure 3:
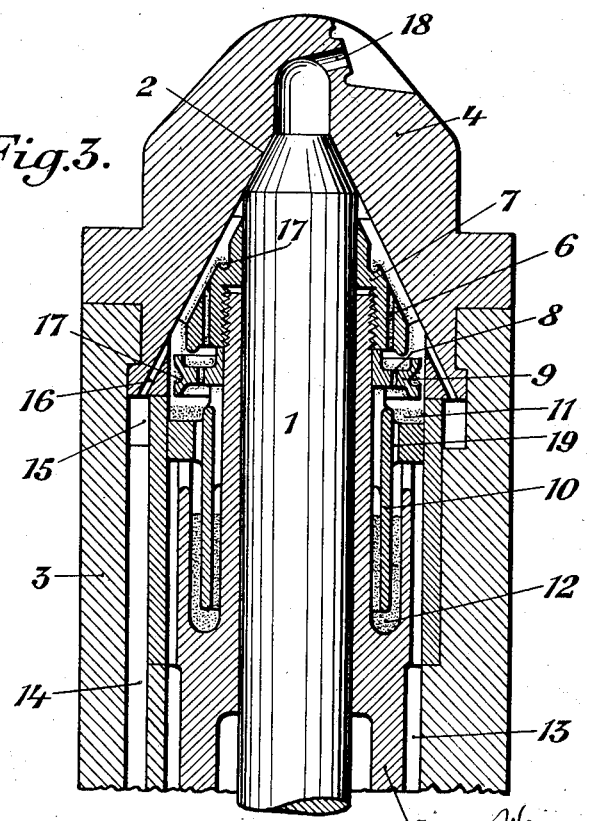

Figure 1 is a fuel injection curve for injection devices of known type, the air curve being shown in full whilst the fuel curve is dotted, Figure 2 illustrates in a similar manner the injection of fuel in accordance with the invention, and Figure 3 shows, by way of example, and in longitudinal section, one construction of injection device according to the invention.

In known types of fuel injection devices when the fuel needle valve begins to open at $a$ (Figure 1) either the air contained between the preliminary storage chamber and the needle valve seating is injected into the cylinder without fuel (as shown in full lines), or when a preliminary quantity of fuel is introduced through the seating surface of the valve, this fuel enters the cylinder without air. The desired mixture of fuel and air is therefore in either case injected only after a delay which is indicated in Figure 1 by the distance, $a$, $b$ and injection is thus delayed, the needle valve closing at $c$.

The full line curve in Fig. 1 represents the rate of injection of the air per unit of time, the dotted-line curve the rate of injection of the fuel per unit of time. The ordinates are a measure of the amount of air and/or fuel, the abscissa representing the time of injection. Hence, the injection of fuel mixed with air into the working cylinder in Fig. 1 only commences at point $b$.

Fig. 1 relates to known embodiments in which air enters the cylinder first, without fuel. In arrangements where the fuel is injected in the seat of the needle itself and the bulk of the fuel is injected without mixing with the air as soon as the needle valve is raised, the dotted curve would start at $a$ and the full-line curve at $b$.

With an injection device according to the present invention, however, and as hereinafter described, as soon as the needle valve begins to open at $a$ (Figure 2) a mixture of air and fuel favourable to ignition, that is with the fuel finely atomized, is injected into the cylinder and ignition is not delayed. Further, at the point $d$ prior to closing of the valve, the injection of fuel is complete and pure air is injected until the valve is closed at $e$. In this way the valve seating is free of fuel which at the end of fuel injection may be adhering thereto whereby carbonization, which is more particularly liable to take place when the fuel is of inferior quality, is reduced to a minimum.

One construction of fuel injection device according to the invention for obtaining this result is illustrated in Figure 3 in which the needle valve 1 cooperates with a seating 2, a valve casing 3 carrying the nozzle head 4. The needle valve 1 is movable within a guide 5 which is screwthreaded to engage a conical ring 7 having bores 6, the ring 7 bearing against a second ring 9 similarly furnished with bores 8 and bearing in turn on a tubular member 10 which rests on the guide 5. The ring 9 and the tubular member 10 are in this way gripped between the ring 7 and the guide 5.

The tubular member 10 and guide 5 are so constructed that they cooperate to form a preliminary storage chamber for the fuel comprising two annular recesses 11 and 12, the axial cross-sectional area of the recess 11 being substantially rectangular whilst that of the recess 12 is U-shaped as shown. An annular air supply conduit 13 communicates with one arm of the U-shaped recess and in the axial direction with the recess 11 which in turn communicates in the radial direction with the other arm of the U-shaped recess 12.

Fuel is fed through a conduit 14 to an annular fuel supply chamber 15 from which the fuel passes through passages 16 directed towards the valve seating 2. The rings 7 and 9 are furnished with grooves 17 so that a part of the fuel entering through the bores 16 and passing over the rings 7 and 9 is trapped in the grooves 17 and also adheres to the surfaces of the rings and the internal surfaces of the bores 6 and 8. A further portion of the fuel becomes lodged in the recess 11 whilst the rest flows downward into the recess 12.

When the injection device is in operation and the needle valve is closed fuel is supplied under pressure through the conduit 14 to the annular chamber 15 from which it passes through the passages 16 and runs over the rings 7 and 9. When the needle valve begins to open the air supplied through the annular air conduit 13 passes through the bores 19, 8 and 6 and the air contained between the valve seating 2 and the recesses 11 and 12 forms a mixture with the fuel retained by the rings 7 and 9 and is injected. Thus, immediately the needle valve commences to open finely atomized fuel is injected through the nozzle 18 into the cylinder. The injection air thereupon first carries the fuel contained in the recess 11 through the valve seating, whereupon the fuel in the recess 12 is atomized and injected.

It will be seen that since the fuel contained in the inner arm of the U-shaped recess 12 acts, in effect, as a back pressure on that contained in the outer arm, the air entering through the conduit 13 will first pass through the bores 19 so as to carry away the fuel in the recess 11 before injecting that in the recess 12. The arrangement is such that the needle valve 1 remains open after all the fuel in the recesses 11 and 12 has been injected so that after injection of the fuel has been completed, any fuel adhering to the valve seating 2 and injection orifice 18 is swept away, the tendency for carbonization to take place at these parts being thereby reduced.

It will be understood that the construction above described is given by way of example only and that details may be modified without departing from the spirit of the invention.

I claim:

1. In an upwardly-directed fuel injection device for engines of the kind in which the fuel and air are injected together into the cylinder, the combination with a needle valve of a preliminary fuel storage chamber below the level of the valve seating, a chamber or conduit from which fuel is introduced above the level of the preliminary chamber, a structure between the seating and preliminary chamber such that a portion of the fuel is retained by parts of this structure as the fuel passes under the action of gravity towards the preliminary chamber, and an air supply conduit communicating with the preliminary chamber for the purpose set forth.

2. In a fuel injection device as claimed in claim 1 the arrangement, that the fuel is introduced from an annular supply chamber through passages directed towards the valve seating.

3. In a fuel injection device as claimed in claim 1 the arrangement, that the surfaces of the structure over which the fuel has to pass on its way to the preliminary chamber are recessed to cause part of the fuel to be retained thereby.

4. In a fuel injection device as claimed in claim 1 the arrangement, that the surfaces of the structure over which the fuel has to pass on its way to the preliminary chamber are provided with annular grooves to cause part of the fuel to be retained thereby.

5. In a fuel injection device as claimed in claim 1, a preliminary storage chamber comprising two annular recesses the axial cross-sections of which are substantially rectangular and U-shaped respectively, an air supply conduit communicating with one arm of the U-shaped recess and also with the rectangular recess which in turn communicates with the other arm of the U-shaped recess.

HEINRICH DINNER.